Feb. 14, 1928.
W. BERRY
1,659,453
FABRIC CUTTING APPARATUS
Filed July 19, 1926　　2 Sheets-Sheet 2
FIG. II.
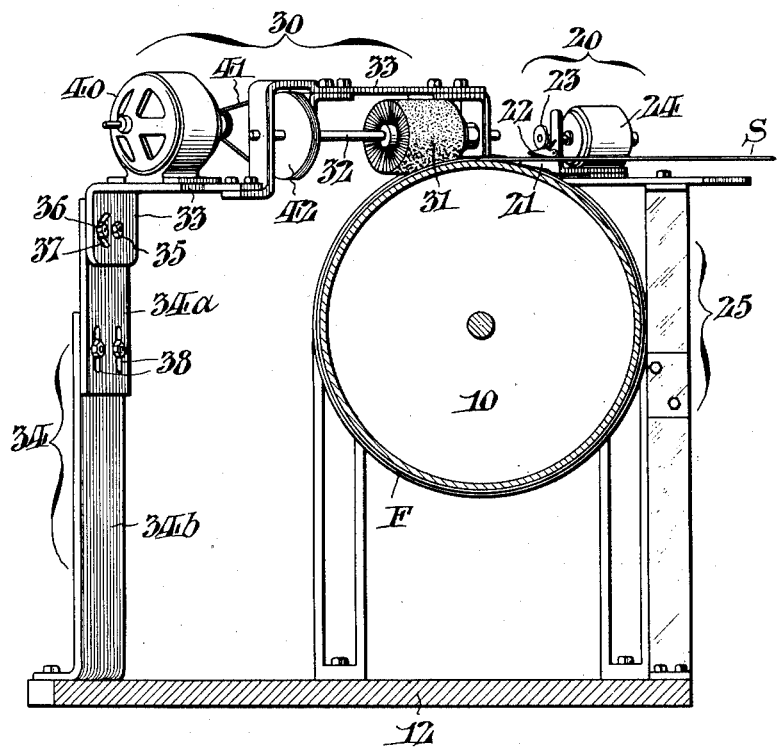
WITNESSES
John C. Bergner.
Frederick A. Kraus.
INVENTOR:
William Berry,
BY Haley & Paul
ATTORNEYS.

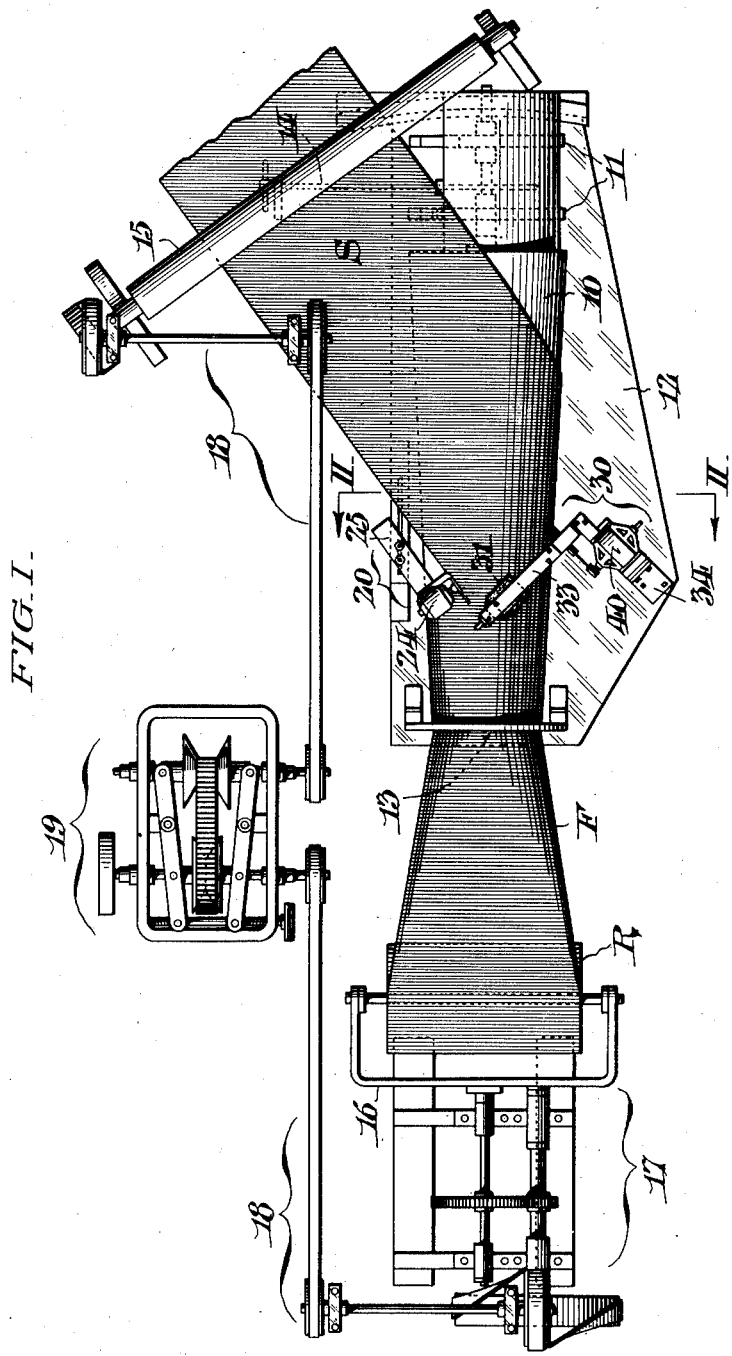

Patented Feb. 14, 1928.

1,659,453

UNITED STATES PATENT OFFICE.

WILLIAM BERRY, OF WILMINGTON, DELAWARE, ASSIGNOR TO JOSEPH BANCROFT & SONS CO., OF ROCKFORD, WILMINGTON, DELAWARE, A CORPORATION OF DELAWARE.

FABRIC-CUTTING APPARATUS.

Application filed July 19, 1926. Serial No. 123,421.

This invention relates to fabric cutting apparatus, more particularly to a type for cutting tubular fabric into continuous bias strips. In connection with the operation of such apparatus, the tubular fabric is spirally progressed over a spreader guide and concurrently presented edge-wise to cutting means for severance into a continuous bias strip. Success of such cutting is dependent upon presentation of the fabric to the cutting means in a slack untensioned condition, and comparatively little difficulty is encountered in cutting closely woven, stiff, or sized fabrics when this rule is strictly adhered to; but loosely woven or soft fabrics have a tendency to wrinkle, and when so presented to the cutting means, tend to clog it with consequent impartation of induced strain which results in uneven cutting and often in tearing.

The main objects of my invention are to overcome the contingencies just mentioned, and to provide means capable of locally smoothing the fabric just before presentation to the cutting means without inducing drag likely to interfere with free progression of the fabric over the spreader guide.

In the drawings, Fig. I shows a plan view of a fabric cutting apparatus conveniently embodying my invention; and Fig. II a cross section thereof taken as indicated by the arrows II—II in Fig. I.

With reference to these illustrations, the letter F designates the tubular fabric which is to be cut, the same being supplied from a bolt or roll R for passage spirally about a spreader guide having the form of a mandrel 10 that is somewhat tapered as shown to facilitate opening of the fabric tube. This mandrel 10 is appropriately supported at one end by bearing standards 11, 11 upstanding from a base board 12, the latter being pivoted at 13 and shiftable angularly by hand screw means shown at 14 for positional adjustment of said mandrel relative to a pair of cooperative nip rolls 15 whereby the bias strip S is drawn away from the mandrel 10 after cutting. The bolt or roll R is mounted in the yoke 16 of a rotating holder device 17 located somewhat in advance of the mandrel 10; while the nip rolls 15 and said holder device 17 are driven, through the medium of an overhead belt system 18, by a variable speed device 19.

The means for cutting the fabric, generally indicated by the numeral 20, comprises a pair of shear blades 21, 22 whereof the latter is spring influenced and vibrated by a cam 23 on the shaft of a driving motor 24, see Fig. II, the whole being supported, with capacity for adjustment relative to the mandrel 10, by a bracket 25 mounted on the base board 12.

In the operation of the apparatus, the tubular fabric F, in being spirally progressed along the mandrel 10 under pull of the nip rolls 15, is passed edge-wise between the blades 21, 22 of the cutting device 20 and thereby cut into the single bias strip S, the speed of said nip rolls 15 and the bodily rotation of the roller R being synchronized through regulation of the variable speed device 19 so that the action proceeds with imposition of minimum tensional restraint upon the web.

The organization thus far described forms the basis of my two earlier United States patent applications Serial No. 689,350 filed January 29, 1924, and Serial No. 26,833 filed April 30, 1925, and reference to specific details has therefore been purposely avoided. Although brief, the foregoing will serve to make clear the purpose of the present invention, which, as previously stated herein, is more particularly concerned with presentation of the fabric to the cutting means in a perfectly smooth condition. This function I vest in a means 30 embodying a rotary brush 31 with a tapered forward end, such brush being set approximately at an angle of 45° to the axis of the mandrel 10 and secured on a shaft 32 which is journalled at opposite ends in bearings afforded by a bracket arm 33 reaching over the top of said mandrel. The bracket arm 33 is sustained by a post 34 with capacity for swivel adjustment about a pivot 35, the adjustment being fixable by a clamp bolt 36 passing through a concentric arcuate slot 37 in said bracket, see Fig. II. The post 34 is anchored on the base board 12, and, as shown, is composed of two parts 34$^a$, 34$^b$ which are shiftable relatively by virtue of clamp bolt and slot connections at 38 so that the level of the bracket arm 33 may be varied to suit special conditions of operation. An electric motor 40, also supported by the bracket 33, is coordinated by a belt 41 with a pulley 42 on the shaft 32 of the brush 31. This motor 40 serves to rotate the brush in a direction counter to the rotative movement of the fabric F on the mandrel 10 as well as in opposition to the movement of the bias cut strip S. As a consequence of the provisions at 35 and 38 the brush 31 may be adjusted both in regard to pressure and area of contact thereof with respect to the mandrel 10 and the fabric F passing thereover. In practice, the adjustment is made entirely in accordance with the nature of the fabric being cut, or in other words, such that the material is engaged by the brush with a very light pressure, i. e., just sufficient to smooth out any wrinkles likely to form locally before the cutting means 20. The fabric F is therefore presented to the cutting means edge on, in a perfectly smooth condition to the avoidance of uneven distorted or ragged cutting as well as choking of the cutting means which latter contingency is invariably attended by rupture or tearing. By my invention, it will be seen, that unsized tubular fabrics of soft texture may be successfully cut with assurance of absolute uniformity in the width and general appearance of the resultant bias strip.

Having thus described my invention I claim:

1. In cutting apparatus of the character described including a spreader guide over which tubular fabric is spirally progressed, and cutting means to concurrently sever the tubular fabric into a continuous bias strip, a rotary brush for engaging the fabric to smooth it locally just before presentation to said cutting means.

2. In cutting apparatus of the character described including a spreader guide over which tubular fabric is spirally progressed cutting means to concurrently sever the tubular fabric into a continuous bias strip, and an independently rotated brush having a taper forward end engaging the fabric to smooth it locally just before presentation to the cutting means, said brush being set at an angle of approximately forty-five degrees to the axis of the spreader guide.

3. In cutting apparatus of the character described including a spreader guide over which tubular fabric is spirally progressed, cutting means to concurrently sever the tubular fabric into a continuous bias strip, and a contact brush independently rotating in a direction counter to the spiral travel of the fabric on the guide aforesaid thereby to smooth it locally just before presentation to the cutting means.

4. In cutting apparatus of the character described including a spreader guide over which tubular fabric is spirally progressed cutting means to concurrently sever the tubular fabric into a continuous bias strip, and an individually rotated brush for engaging the fabric to smooth it locally just before presentation to the cutting means, and means to support said brush and its drive means with provisions enabling positional adjustment thereof relative to the spreader guide.

In testimony whereof, I have hereunto signed my name, at Wilmington, Delaware, this 15th day of July, 1926.

WILLIAM BERRY.